United States Patent
Hirao et al.

(10) Patent No.: US 12,185,183 B2
(45) Date of Patent: Dec. 31, 2024

(54) SUPPORTER SELECTION APPARATUS, SUPPORTER SELECTION METHOD AND PROGRAM

(71) Applicant: NIPPON TELEGRAPH AND TELEPHONE CORPORATION, Tokyo (JP)

(72) Inventors: Misa Hirao, Tokyo (JP); Asuka Miyake, Tokyo (JP); Hiroya Minami, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 422 days.

(21) Appl. No.: 17/619,243

(22) PCT Filed: Jun. 17, 2019

(86) PCT No.: PCT/JP2019/023959
§ 371 (c)(1),
(2) Date: Dec. 14, 2021

(87) PCT Pub. No.: WO2020/255220
PCT Pub. Date: Dec. 24, 2020

(65) Prior Publication Data
US 2022/0286808 A1    Sep. 8, 2022

(51) Int. Cl.
H04W 4/02    (2018.01)

(52) U.S. Cl.
CPC .................. H04W 4/023 (2013.01)

(58) Field of Classification Search
CPC ....... H04W 4/023; H04W 4/90; H04W 4/021; G06Q 50/10

USPC ....................................................... 455/456.3
See application file for complete search history.

(56) References Cited

U.S. PATENT DOCUMENTS

| 7,181,407 | B1 | 2/2007 | Kanevsky et al. |
| 8,195,384 | B1* | 6/2012 | Billman .................. H04L 67/10 701/515 |
| 2009/0287497 | A1* | 11/2009 | Brown ................. G06Q 30/016 705/304 |

(Continued)

FOREIGN PATENT DOCUMENTS

| JP | 2014132728 A | 7/2014 |
| JP | 2018173693 A | 11/2018 |

OTHER PUBLICATIONS

General Incorporated Association Players (2019) "& HAND / And Hand From kindness to a society where kindness is born" & HAND project [online] Accessed on Apr. 15, 2019(Reading Day) website: https://www.andhand-project.com/.

*Primary Examiner* — Don N Vo

(57) ABSTRACT

A helper selecting device for selecting a helper for a requester who requires help is provided with: a first storage unit for storing helper candidate information received from a helper candidate terminal; a second storage unit for storing support methods; a helper selecting unit which selects a helper for the requester from among helper candidates, on the basis at least of the distance between the requester and the helper candidates, with reference to the first storage unit, and determines a support method for the requester with reference to the second storage unit; and a notifying unit for notifying the support method for the requester to the helper candidate terminal of the helper candidate selected as the helper.

20 Claims, 13 Drawing Sheets

(56) References Cited

U.S. PATENT DOCUMENTS

2017/0032253 A1\* 2/2017 Maekawa .......... G06F 16/90335
2017/0061512 A1\* 3/2017 Avcil .................... H04W 4/023
2020/0167597 A1\* 5/2020 Nguyen ................ G06V 40/20

\* cited by examiner

Fig. 5

| HELPER CANDIDATE ID | CURRENT LOCATION | DESTINATION | HELPER CANDIDATE STATE | NUMBER OF VISITS |
|---|---|---|---|---|
| 01 | 35.225695, 139.663323 | A STATION NORTH TICKET GATE | A | 5+ |
| 02 | 35.223950, 139.662345 | B BUILDING | C | 2-4 |
| 03 | 35.223613, 139.663332 | C RESTAURANT | B | 1 |
| 04 | 35.658777, 139.745433 | D STATION EXIT 1 | B | 2-4 |
| ... | ... | ... | ... | ... |

Fig. 6

| HAS PLENTY OF SPARE TIME | A |
|---|---|
| HAS A LITTLE SPARE TIME | B |
| HAS NO SPARE TIME | C |

Fig. 7

| VISITED AT LEAST 5 TIMES | 5+ |
|---|---|
| VISITED 2 TO 4 TIMES | 2-4 |
| FIRST VISIT | 1 |

Fig. 8

| REQUESTER ATTRIBUTE | REQUESTED ITEM | SUPPORT METHOD |
|---|---|---|
| I AM VISUALLY IMPAIRED | I WANT SUPPORT TO TRAVEL TO MY DESTINATION | I WOULD LIKE TO HOLD ONTO YOUR ARM OR SHOULDER, WITH YOU WALKING ONE STEP AHEAD. WHEN TURNING A CORNER, OR IF THERE IS A STEP, PLEASE CONVEY THIS FACT TO ME VERBALLY AS WE PROCEED. |
| I AM VISUALLY IMPAIRED | I WANT SUPPORT TO TRAVEL TO A NEARBY TOILET | GUIDE ME TO THE ENTRANCE FOR MEN OR WOMEN. IF THERE IS A QUEUE, GUIDE ME TO THE BACK OF THE QUEUE. |
| ... | ... | ... |
| I USE A WHEELCHAIR | I WANT SUPPORT TO TRAVEL TO A NEARBY TOILET | PLEASE GUIDE ME TO A BARRIER FREE TOILET. DO NOT MOVE THE WHEELCHAIR SUDDENLY. LET ME KNOW BEFORE MOVING. |
| ... | ... | ... |

Fig. 10

PLEASE INPUT USER ID

PLEASE SELECT ITEM FOR WHICH YOU WOULD LIKE TO REQUEST HELP

I WANT SUPPORT TO TRAVEL TO MY DESTINATION

I WANT SUPPORT TO TRAVEL TO A NEARBY TOILET

I WANT YOU TO TELL ME ABOUT THE SURROUNDING CONDITIONS

PLEASE SELECT ITEMS THAT APPLY TO YOU

I AM VISUALLY IMPAIRED

I USE A WHEELCHAIR

I AM HEARING IMPAIRED

SEND

Fig. 12

A HELPER HAS BEEN FOUND

WHEN A HELPER HAS BEEN FOUND, PLEASE WAIT WHERE YOU ARE FOR A WHILE.

IF NO HELPER HAS BEEN FOUND, PLEASE MAKE ANOTHER REQUEST IN A WHILE.

SUPPORTER SELECTION APPARATUS, SUPPORTER SELECTION METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/023959, filed on 17 Jun. 2019, the disclosure of which is hereby incorporated herein by reference in its entirety.

TECHNICAL FIELD

The present invention relates to technology for selecting and notifying the most appropriate helper from among a plurality of candidates, taking into account the content of a request by a user and the situation of the helper, when the user tries to request another person for help when away from home.

BACKGROUND ART

Anyone can experience situations in which a difficulty is faced when away from home, requiring help from another person. People who face mobility difficulties, such as visually impaired people or physically disabled people, are considered to be more likely to be placed in such situations.

However, there are problems in that it is difficult for others who would like to ask for help to call out to strangers, and severely visually impaired people do not know where people are so cannot call out for help. There are various conventional techniques (NPL 1, for example) aimed at solving this problem.

NPL 1 discloses a technique aimed at connecting a person facing a difficult relating to mobility in the city, with a supporter who wants to help people such as these.

CITATION LIST

Non Patent Literature

[NPL 1] "&HAND Project" https://www.andhand-project.com/

SUMMARY OF THE INVENTION

Technical Problem

However, with conventional techniques, since the system does not recognize the situation of the person trying to help, the person who is trying to help, even if willing to help, may not be able to respond, or may not be able to respond adequately, depending on the timing of the request or the request content. For example, if the requester is lost and has requested guidance to a destination, there may be cases in which the helper does not have much spare time and can only provide guidance to an intermediate point.

Further, with the conventional technique, even if the request content is notified to the helper, the helper is not presented with the method to be used to provide help. The helper therefore does not understand the support method, and may not be able to respond appropriately. For example, when leading a visually impaired person, it is desirable for the visually impaired person to hold the armor shoulder of the helper and for the helper to walk one step ahead, and when turning a corner, or if there is a step, it is desirable to proceed while conveying this fact verbally. However, if the helper does not know such a support method, it is conceivable that he or she may lead the visually impaired person silently, and the visually impaired person who requested help may feel anxious or unsafe.

The present invention takes account of these points, and the objective thereof is to provide a technique which makes it possible to select a helper on the basis of the situation of the helper candidates, and to notify the support method to the selected helper.

Means of Solving the Problem

According to the disclosed technology, there is provided a helper selecting device for selecting a helper for a requester who requires help, provided with: a first storage unit for storing helper candidate information received from a helper candidate terminal; a second storage unit for storing support methods; a helper selecting unit which selects a helper for the requester from among helper candidates, on the basis at least of the distance between the requester and the helper candidate, with reference to the first storage unit, and determines a support method for the requester with reference to the second storage unit; and a notifying unit for notifying the support method for the requester to the helper candidate terminal of the helper candidate selected as the helper.

Effects of the Invention

According to the disclosed technique, a technique is provided which makes it possible to select a helper on the basis of the situation of the helper candidate, and to notify the support method to the selected helper.

BRIEF DESCRIPTION OF DRAWINGS

FIG. 5 is a drawing illustrating an example of information held by a helper candidate information storage unit.

FIG. 6 is a drawing illustrating an example of a helper candidate state.

FIG. 7 is a drawing illustrating an example of the number of visits.

FIG. 8 is a drawing illustrating an example of information held by a support method storage unit.

FIG. 10 is a drawing illustrating an example of an input screen of a requester terminal.

FIG. 12 is a drawing illustrating an example of an output screen of the requester terminal.

DESCRIPTION OF EMBODIMENTS

An embodiment (the present embodiment) of the present invention will now be described with reference to the drawings. The embodiment described hereinafter is merely an example, and the embodiments to which the present invention applies are not limited to the following embodiment.

(Overall Configuration of System)

Figure 1:
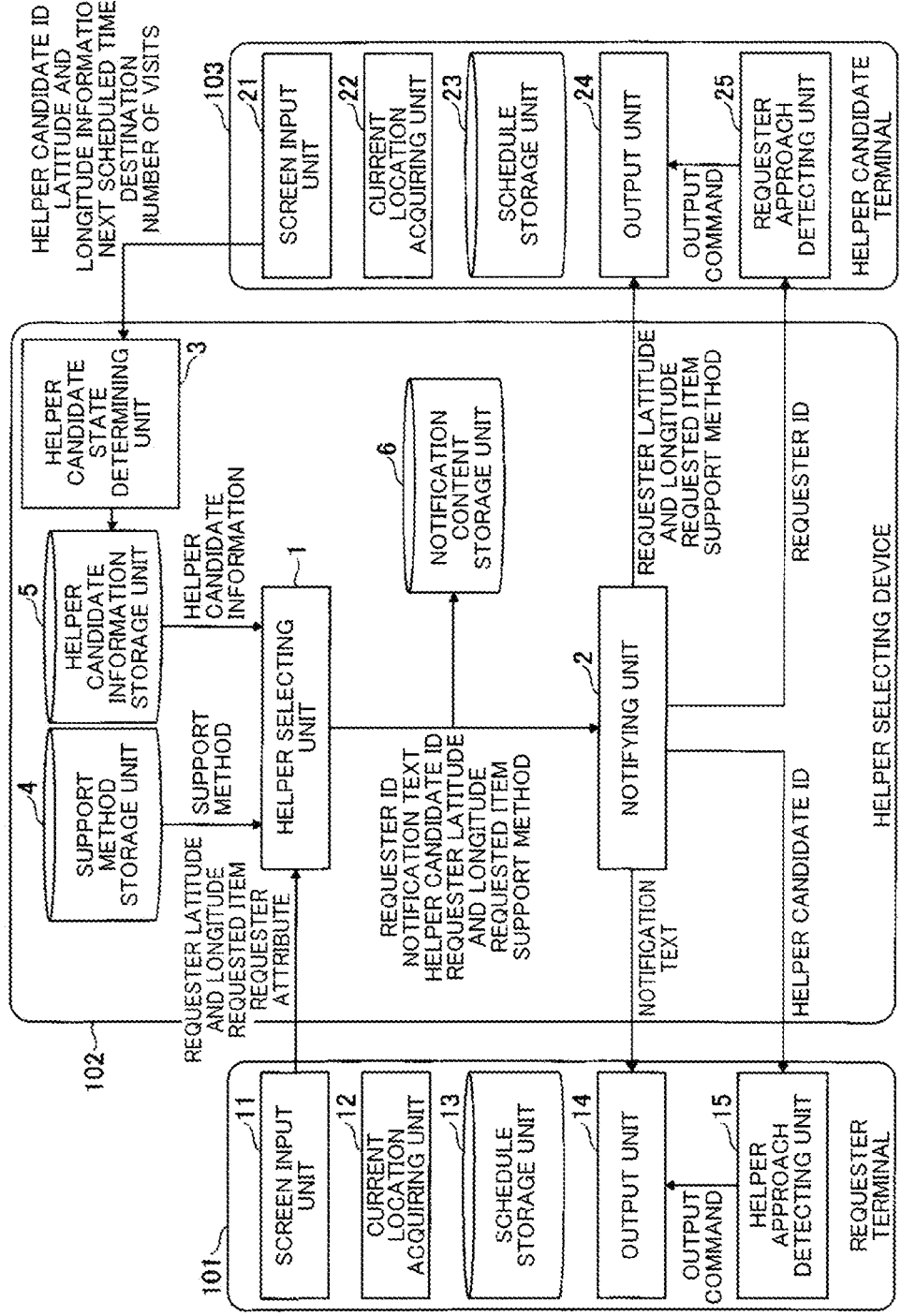
FIG. 1 is a system configuration diagram according to an embodiment of the present invention.

FIG. 1 illustrates a system configuration example according to the present embodiment. As illustrated in FIG. 1, the present system includes a helper selecting device 102 for selecting a helper, and is configured such that a requester terminal 101 and a helper candidate terminal 103 communicate with the helper selecting device 102 via a network (the internet or the like).

In the present embodiment, the helper selecting device 102 is assumed to be implemented as a web service, but implementing the helper selecting device 102 as a web service is one example.

As illustrated in FIG. 1, the helper selecting device 102 includes a helper selecting unit 1, a notifying unit 2, a helper candidate state determining unit 3, a support method storage unit 4, a helper candidate information storage unit 5, and a notification content storage unit 6. It should be noted that the helper candidate information storage unit 5 may be referred to as a first storage unit, and the support method storage unit 4 may be referred to as a second storage unit.

The requester terminal 101 includes a screen input unit 11, a current location acquiring unit 12, a schedule storage unit 13, an output unit 14, and a helper approach detecting unit 15. The helper candidate terminal 103 includes a screen input unit 21, a current location acquiring unit 22, a schedule storage unit 23, an output unit 24, and a requester approach detecting unit 25. The requester terminal 101 and the requester terminal 101 are both, for example, user terminals such as a smartphone or a tablet.

A user requesting help (referred to as requester hereinbelow) accesses the helper selecting device 102 from the requester terminal 101, and inputs data from the screen input unit 11. A user willing to provide help (referred to as helper candidate hereinbelow) accesses the helper selecting device 102 from the helper candidate terminal 103, and inputs data from the screen input unit 21.

Helper selection processing is performed by the helper selecting device 102, and the result of the helper selection processing is sent to the output unit 14 of the requester terminal 101 and the output unit 24 of the helper candidate terminal 103, which output the result.

(Example of Device Hardware Configuration)

The helper selecting device 102, the requester terminal 101, and the helper candidate terminal 103 can all be realized by causing a computer to execute a program, for example.

That is, these devices can be realized by causing a program corresponding to the processing implemented by the device to be executed using hardware resources such a CPU and memory built into the computer. The program can be recorded, stored, and distributed on a computer-readable recording medium (portable memory, for example). Further, the program can be provided via a network such as the internet or e-mail.

Figure 2:
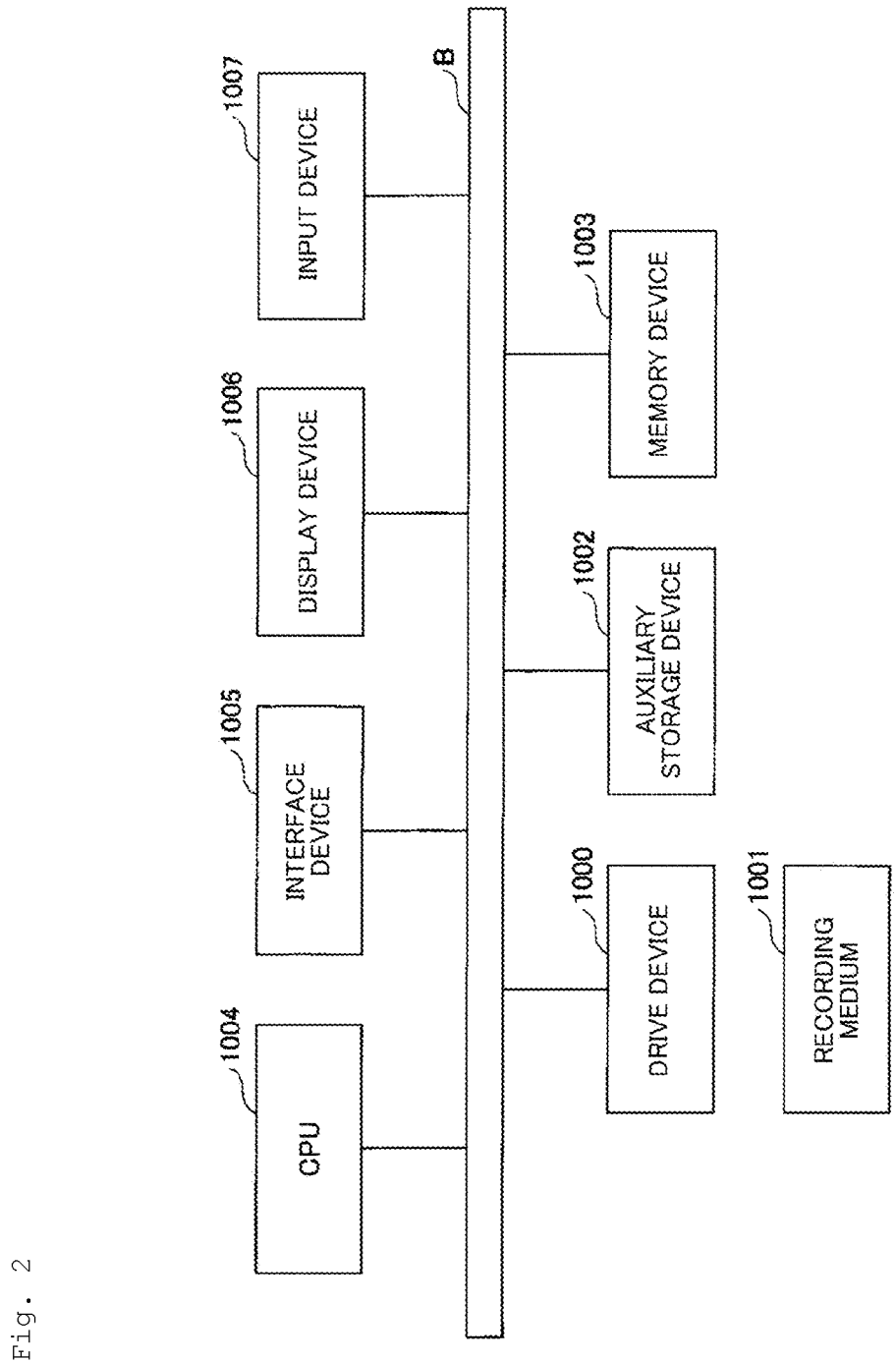
FIG. 2 is a drawing illustrating an example of the device hardware configuration.

FIG. 2 is a drawing illustrating an example of the hardware configuration of the computer. The computer in FIG. 2 includes, for example, a drive device 1000, an auxiliary storage device 1002, a memory device 1003, a CPU 1004, an interface device 1005, a display device 1006, and an input device 1007, which are connected to one another by means of a bus B.

The program for realizing the processing performed by the computer is provided, for example, using a recording medium 1001 such as a CD-ROM or a memory card. If the recording medium 1001 on which the program is stored is set in the drive device 1000, the program is installed from the recording medium 1001 into the auxiliary storage device 1002 by way of the drive device 1000. However, installation of the program does not necessarily need to be performed using the recording medium 1001, and may be performed by downloading from another computer via the network. The auxiliary storage device 1002 stores the installed program, and also stores necessary files and data, for example.

If a program startup instruction is issued, the memory device 1003 reads and stores the program from the auxiliary storage device 1002. The CPU 1004 realizes a function relating to the device in accordance with the program stored by the memory device 1003. The interface device 1005 is used as an interface for connecting to the network, and functions as an input means and an output means via the network. The display device 1006 displays a GUI (Graphical User Interface) or the like from the program. The input device 157 consists of a keyboard and a mouse, buttons, or a touch panel, for example, and is used to input various operation instructions.

Embodiment 1 and Embodiment 2 will now be described, as operational examples of a system according to the present embodiment.

Embodiment 1

Embodiment 1 will first be described. Embodiment 1 is an example of a case in which a visually impaired help requester requests support to travel to a destination. The person who will support the travel to the destination is preferably a person with plenty of spare time, or a person having the same destination as the help requester, among the helper candidates. If there is no such helper candidate, the next most preferable person is someone who has a little spare time, is well acquainted with the place, having visited many times, and is close to the requester. In Embodiment 1, the helper candidates are selected from this viewpoint.

Figure 3:
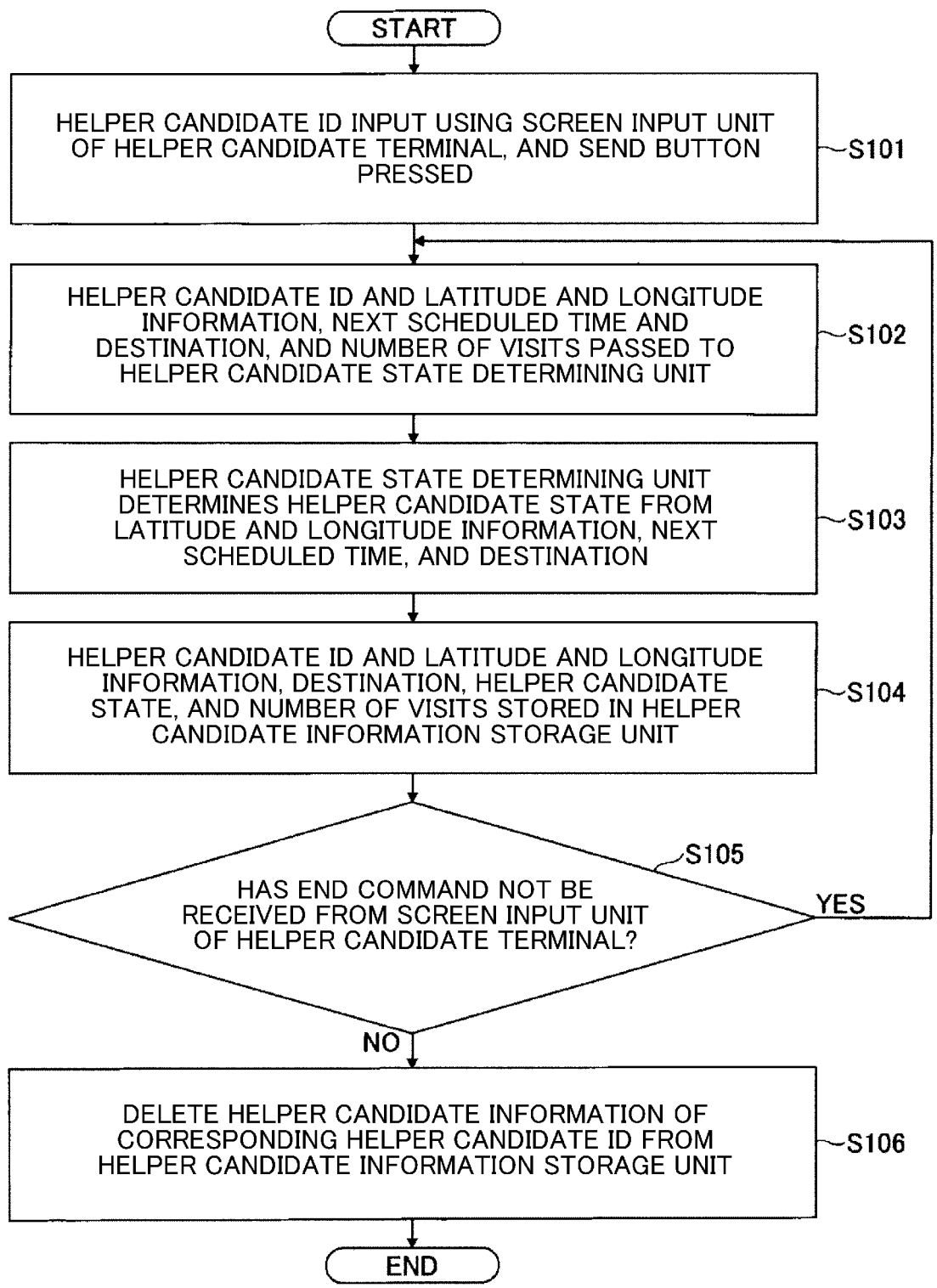
FIG. 3 is a flowchart when a helper candidate registers information.
Figure 4:
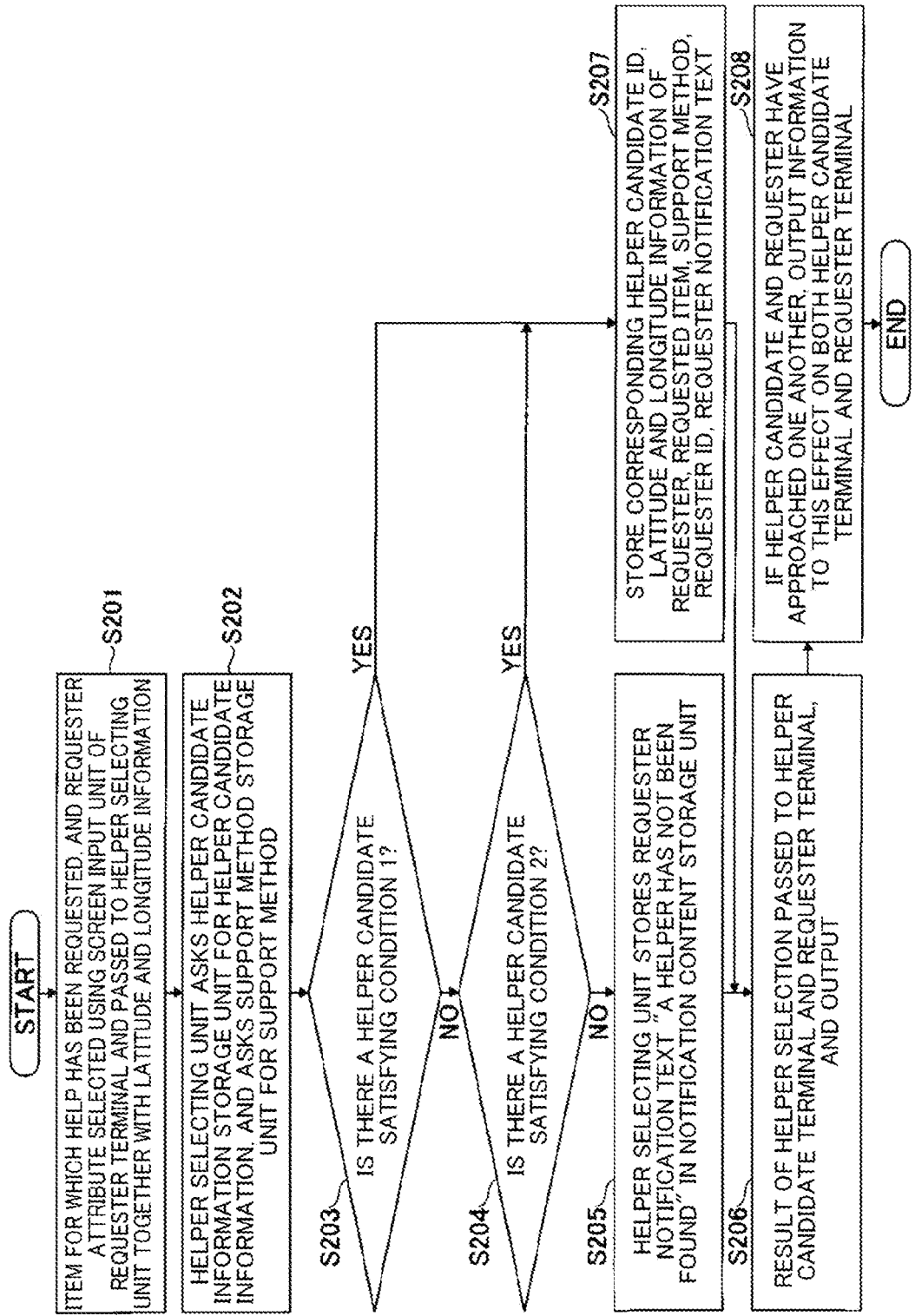
FIG. 4 is a flowchart according to Embodiment 1.

The operation of Embodiment 1 will be described with reference to the flowcharts in FIG. 3 and FIG. 4. A prerequisite for helper candidate selection is that the helper candidate has registered helper candidate information in advance. The processing performed when a helper candidate registers information will be described in accordance with the procedure in the flowchart in FIG. 3.

<S101>

Figure 9:
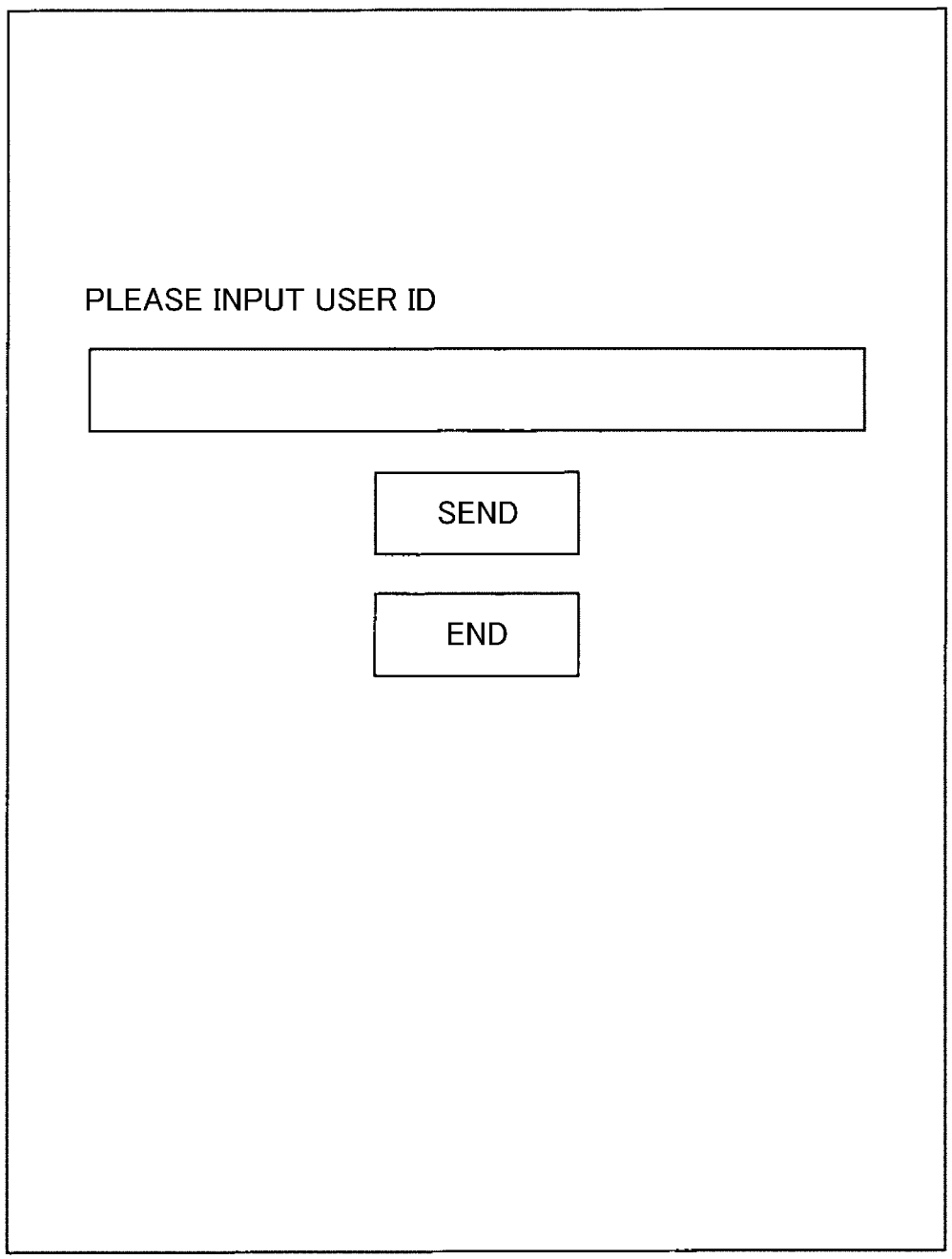
FIG. 9 is a drawing illustrating an example of an input screen of a helper candidate terminal.

In S101, the input screen illustrated in FIG. 9, for example, is displayed on the display (consisting of the screen input unit 21 and the output unit 24) of the helper candidate terminal 103. The screen input unit 21 has the function of displaying the input screen, the function of inputting information from the input screen, and the function of transmitting the input information.

The helper candidate inputs a helper candidate ID from the input screen. "01" is input as the helper candidate ID, for example. It should be noted that the methods for carrying out these inputs include typical input methods performed by tapping the screen, speech input methods and the like, and various other methods. The helper candidate then presses a send button.

<S102>

In S102, the helper candidate ID "01", latitude and longitude information, the next scheduled time, the destination, and the number of visits are passed to the helper candidate state determining unit 3 of the helper selecting device 102.

The latitude and longitude information is information acquired by the current location acquiring unit 22, such as "35.225695, 139.663323".

The next scheduled time, the destination, and the number of visits are stored in the schedule storage unit 23, and this information is acquired from the schedule storage unit 23 and is passed to the helper candidate state determining unit 3. The next scheduled time is "13:00", for example, and the destination is "north ticket gate of A station", for example. The number of visits is the number of times the helper candidate has visited an area within a radius of 200 m of the current location of the helper candidate ("200 m" is an example of a threshold), and FIG. 7 illustrates an example of the number of visits. From FIG. 7, the number of visits is "5+", for example. It should be noted that, since the distance between the helper candidate to be selected and the requester is small, if the helper candidate has visited the area around their current location many times, this implies that the helper candidate has visited the area around the current location of the requester many times and is well acquainted therewith, and is considered to be capable of providing support smoothly. Accordingly, the number of visits is defined as the number of times the helper candidate has visited the area around the current location of the helper candidate (in the example described hereinabove, are area inside a circle having a radius of 200 m, centered at the current location).

It should be noted that the schedule storage unit 23 is assumed to be a scheduler function typically installed on a smartphone or a tablet, but in the case of a terminal that is not provided with such a function, the helper candidate may input the next scheduled time and the destination directly using the screen input unit 21.

<S103>

In S103, the helper candidate state determining unit 3 of the helper selecting device 102 determines a helper candidate state from the latitude and longitude information, the next scheduled time, and the destination. For example, assume that the distance between the point with the latitude and longitude information "35.225695, 139.663323", which is the current location of the helper candidate ID 01, and the destination "north ticket gate of A station" is 80 m, and the current time is 12:25. Further, assume that the helper candidate state is defined as illustrated in FIG. 6.

The helper candidate state determining unit 3 determines that if the distance from the current location to the next destination is not more than 100 m, and if there is a period of at least 30 minutes until the next scheduled time, then "there is plenty of spare time", and defines, from FIG. 6, that that helper candidate state of the helper candidate ID01 is "A".

Further, if the distance from the current location to the next destination is more than 100 m, and if there is a period of less than 10 minutes until the next scheduled time, then, from FIG. 6, it is defined that "there is no spare time", and that the helper candidate state of the helper candidate is "C". Further, in other cases, it is defined that "there is a little spare time", and that the helper candidate state is "B".

It should be noted that "100 m", "30 minutes", and "10 minutes" are each examples of thresholds, and values other than "100 m", "30 minutes", and "10 minutes" may be used as the thresholds. Further, categorizing the helper candidate state as "A", "B", "C" is also an example.

<S104>

Next in S104, the helper candidate state determining unit 3 stores the helper candidate ID, the latitude and longitude information, the destination, the helper candidate state, and the number of visits in the helper candidate information storage unit 5.

More specifically, the helper candidate state determining unit 3 stores the helper candidate ID "01", the latitude and longitude information "35.225695, 139.663323", the destination "north ticket gate of A station", the helper candidate state "A", and the number of visits "5+" in the helper candidate information storage unit 5. FIG. 5 illustrates an example of the information stored in the helper candidate information storage unit 5. The same processing is performed for a plurality of helper candidates, and the helper candidate information storage unit 5 holds the helper candidate information of the plurality of helper candidates.

<S105>

The helper candidate state determining unit 3 determines whether an end command has not been received from the screen input unit 21 of the helper candidate terminal 103, and if an end command has not been received, S102 to S104 are repeated at fixed intervals.

That is, even after the helper candidate information has once been registered, the processing from S102 to S104 is repeated at fixed intervals, overwriting the helper candidate information, until the end command is received from the screen input unit 21. If the end command has been received, the flow proceeds to S106.

<S106>

In the case of the screen in FIG. 9, for example, the end command is issued when the end button is pressed, and if the end command has been issued, in S106, the helper candidate information of the corresponding helper candidate ID is deleted from the helper candidate information storage unit 5.

The processing performed when the help requester requests support, and the helper selecting device 102 selects a helper, will next be described in accordance with the procedure in the flowchart in FIG. 4.

<S201>

In S201, the input screen illustrated in FIG. 10, for example, is displayed on the display (consisting of the screen input unit 11 and the output unit 14) of the requester terminal 101. The screen input unit 11 has the function of displaying the input screen, the function of inputting information from the input screen, and the function of transmitting the input information.

The requester inputs a requester ID from the input screen. "101" is input as the requester ID, for example. Next, "I want support to travel to my destination" is selected as the item for which support is being requested, and "I am visually impaired" is selected as a requester attribute. It should be noted that typical input methods performed by tapping the screen, speech input methods, and various other methods can be applied as the methods for carrying out these inputs.

Next, when the requester presses the send button, the requester ID "101", the latitude and longitude information, the destination, and the requester attribute are sent to the helper selecting unit 1. The latitude and longitude information is acquired by the current location acquiring unit 12, and is "35.224237, 139.663318", for example. Further, the destination is acquired from the schedule storage unit 13, and is "B building", for example.

It should be noted that the schedule storage unit 13 is assumed to be a scheduler function typically installed on a smartphone or a tablet, but in the case of a terminal that is not provided with such a function, the requester may input the destination directly using the screen input unit 11.

<S202>

Next, in S202, the helper selecting unit 1 acquires a support method corresponding to the requester attribute and the requested item, with reference to the support method storage unit 4.

FIG. 8 illustrates an example of the information stored in the support method storage unit 4. Here, the helper selecting unit 1 acquires the support method "I would like to hold onto your arm or shoulder, with you walking one step ahead. When turning a corner, or if there is a step, please convey this fact tome verbally as we proceed." corresponding to the requester attribute "I am visually impaired" and the requested item "I want support to travel to my destination".

Further, in S202, the helper selecting unit 1 acquires the helper candidate information with reference to the helper candidate information storage unit 5, which stores the information illustrated in FIG. 5.

<S203>

In S203, the helper selecting unit 1 determines whether a helper candidate satisfying condition 1 exists among the helper candidates referred from the helper candidate information storage unit 5. Condition 1 is that "the distance between the helper candidate and the requester is not more than 200 m and the helper candidate has spare time, or the distance between the helper candidate and the requester is not more than 200 m and the destination of the helper candidate is the same as that of the requester". It should be noted that "200 m" is an example of a threshold.

More specifically, the helper selecting unit 1 searches for a helper candidate for whom the distance to the requester is not more than 200 m and the helper candidate state is "A", indicating that there is plenty of spare time, or for whom the distance to the requester is not more than 200 m and the destination is "B building", which is the same as that of the requester ID101. Here, since the helper candidate ID01 corresponds thereto, the flow proceeds to S207. If no corresponding helper candidate is found, the flow proceeds to S204.

<S207>

In S207, the helper selecting unit 1 stores the corresponding helper candidate ID, the latitude and longitude information of the requester, the requested item, the support method, the requester ID, and a requester notification text "A helper has been found" in the notification content storage unit.

More specifically, the helper selecting unit 1 stores the helper candidate ID "01" of the selected helper candidate, the latitude and longitude information "35.224237, 139.663318" of the requester, the requested item "I want support to travel to my destination", the support method "I would like to hold onto your arm or shoulder, with you walking one step ahead. When turning a corner, or if there is a step, please convey this fact tome verbally as we proceed." the destination "B building", the requester ID "101", and the requester notification text "A helper has been found" in the notification content storage unit 6.

<S204>

In S204, the helper selecting unit 1 determines whether a helper candidate satisfying condition 2 exists in the helper candidates referred from the helper candidate information storage unit 5. Condition 2 is that "the distance between the helper candidate and the requester is not more than 100 m, the helper candidate state is "B", indicating that there is a little spare time, and that the number of visits is "5+", indicating five or more times". It should be noted that "100 m" and "five times" are examples of threshold. The number of visits is the number of times the helper candidate has visited an area within a radius of 200 m of the current location of the helper candidate ("200 m" is an example of a threshold).

If there is a corresponding helper candidate, the flow proceeds to S207, and if a helper candidate is not found, the flow proceeds to S205.

<S205>

In S205, the helper selecting unit 1 stores the requester ID "101", and the requester notification text "A helper has not been found" in the notification content storage unit 6.

<S206>

If the flow transitions from S205 to S206, the notifying unit 2 passes the requester notification text "A helper has not been found" to the output unit 14 of the requester terminal 101 of the requester ID "101" stored in the notification content storage unit 6, and the output unit 14 outputs the notification text.

If the flow transitions from S207 to S206, the notifying unit 2 passes the position information of the requester, the requested item, and the support method to the output unit 24 of the terminal 103 of the helper candidate ID stored in the notification content storage unit 6, and passes the notification text to the output unit 14 of the requester terminal 101, and the respective output units 24, 14 output the received information.

More specifically, notifying unit 2 first reads the helper candidate ID "01" of the selected helper candidate, the latitude and longitude information "35.224237, 139.663318" of the requester, the requested item "I want support to travel to my destination", the destination "B building", the support method "I would like to hold onto your arm or shoulder, with you walking one step ahead. When turning a corner, or if there is a step, please convey this fact to me verbally as we proceed.", the requester ID "101", and the requester notification text "A helper has been found", which have been stored in the notification content storage unit 6.

Next, the notifying unit 2 passes position information of the requester, based on the latitude and longitude information "35.224237, 139.663318" of the requester, the requested item "I want support to travel to my destination", the destination "B building", and the support method "I would like to hold onto your arm or shoulder, with you walking one step ahead. When turning a corner, or if there is a step, please convey this fact tome verbally as we proceed." to the output unit 24 of the terminal 103 of the helper candidate ID01, and the output unit 24 outputs this information.

Further, the notifying unit 2 passes the notification text "A helper has been found" to the output unit 14 of the terminal 101 of the requester ID101, and the output unit 14 outputs the same.

Figure 11:
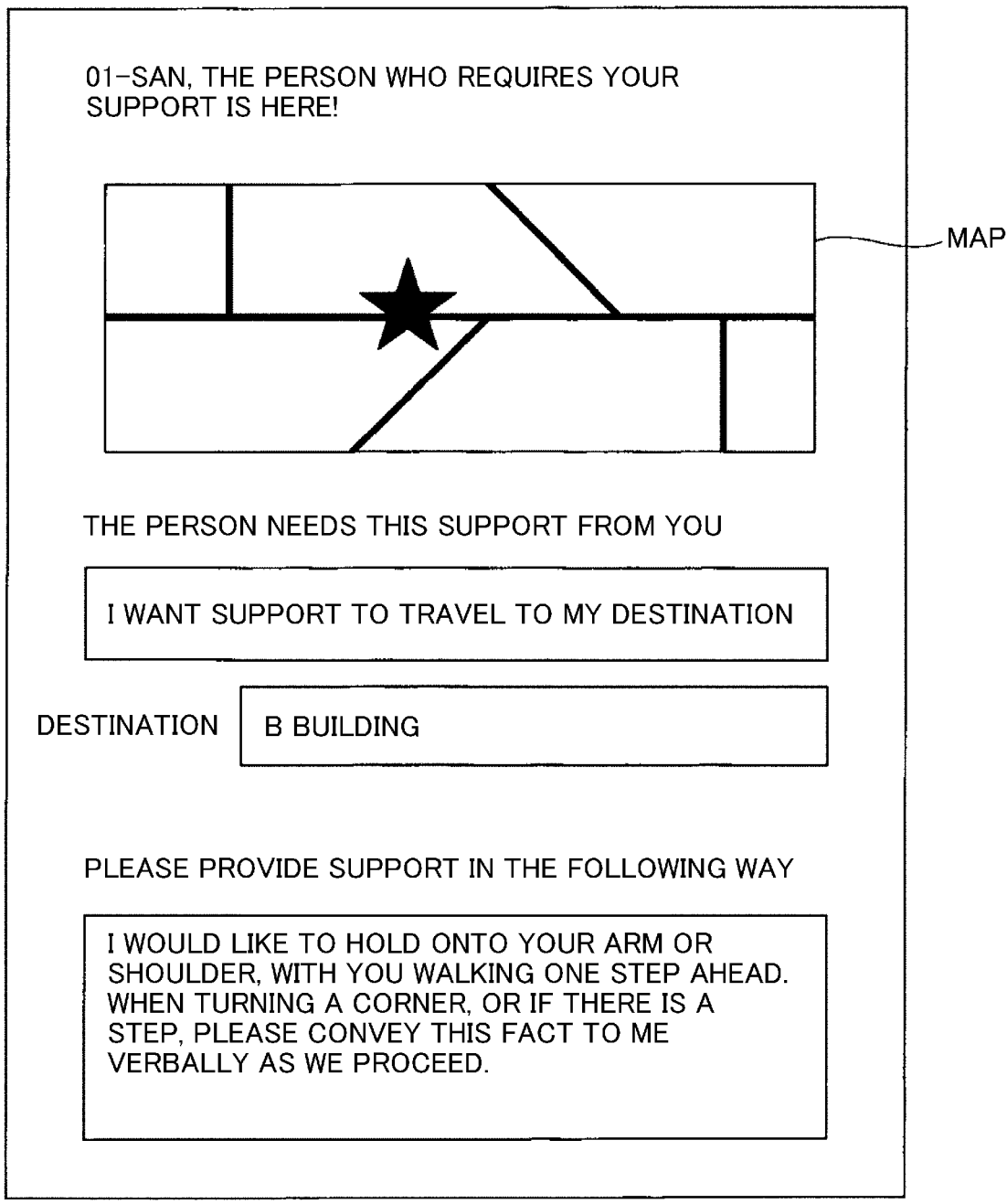
FIG. 11 is a drawing illustrating example 1 of an output screen of the helper candidate terminal.

FIG. 11 illustrates an example of the output screen of the helper candidate terminal 103, and FIG. 12 illustrates an example of the output screen of the requester terminal 101.

It should be noted that methods for displaying visually on a screen, methods for outputting using speech, and various other methods can be used as the output method for the output unit 24 of the helper candidate terminal 103, and the output method for the output unit 14 of the requester terminal 101.

<S208>

Furthermore, in S208, the notifying unit 2 passes the helper candidate ID stored in the notification content storage unit 6 to the helper approach detecting unit 15 of the requester terminal 101, and passes the requester ID to the requester approach detecting unit 25 of the helper candidate terminal 103.

The helper approach detecting unit 15 issues an output command to the output unit 14 when the helper candidate and the requester approach one another, and the output unit 14 outputs information indicating that the helper candidate has approached the requester. Similarly, the helper approach detecting unit 25 issues an output command to the output unit 24 when the helper candidate and the requester approach one another, and the output unit 24 outputs information indicating that the helper candidate has approached the requester.

The helper approach detecting unit 15 and the requester approach detecting unit 25 can be realized using short-range radio communication technology such as Bluetooth (registered trademark), for example.

Further, methods for outputting using speech, vibration, or light emission, and various other methods, can be used as the output method for the output unit 24 of the helper candidate terminal 103, and the output method for the output unit 14 of the requester terminal 101. It is thus possible for a helper to provide help reliably to a requester, such as a visually impaired person without a white cane, or a hearing-impaired person, who does not appear to have a disability.

Embodiment 2

Embodiment 2 will now be described. Embodiment 2 is an example of a case in which a help requester who uses a wheelchair requests support to travel to a toilet. Support to travel to a toilet is a help request requiring urgency, and a desirable person, among the helper candidates, is considered to be someone who is close to the requester, has spare time, and is well acquainted with the place, having visited many times. If there is no such helper candidate, the next most desirable person is someone who is close to the requester, and has spare time. If there is no such helper candidate, a who is close to the requester is considered to be desirable. In Embodiment 2, the helper is selected from this viewpoint.

In Embodiment 2 also, the helper candidate registers helper candidate information in advance. The processing performed when the helper candidate registers information is the same as in Embodiment 1.

Figure 13:
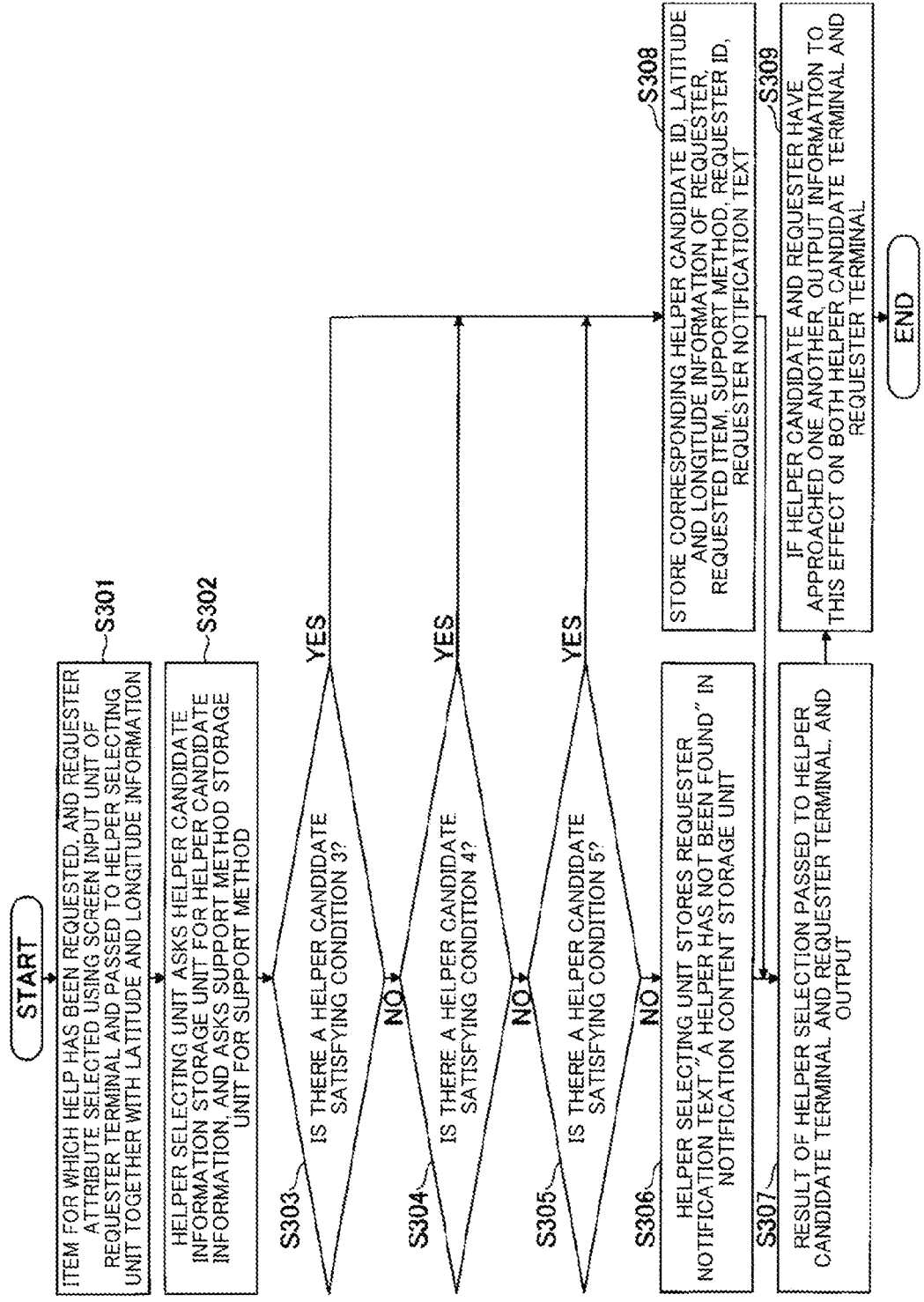
FIG. 13 is a flowchart according to Embodiment 2.

The processing performed when the help requester requests support, and the helper selecting device 102 selects a helper, will next be described in accordance with the procedure in the flowchart in FIG. 13.
<S301>
In S301, the input screen illustrated in FIG. 10, for example, is displayed on the display (consisting of the screen input unit 11 and the output unit 14) of the requester terminal 101. The screen input unit 11 has the function of displaying the input screen, the function of inputting information from the input screen, and the function of transmitting the input information.

The requester inputs a requester ID from the input screen. "102" is input as the requester ID, for example. Next, "I want support to travel to a nearby toilet" is selected as the item for which help is being requested, and "I use a wheelchair" is selected as the requester attribute. It should be noted that typical input methods performed by tapping the screen, speech input methods, and various other methods can be applied as the methods for carrying out these inputs.

Next, when the requester presses the send button, the requester ID "102", the latitude and longitude information, and the requester attribute are sent to the helper selecting unit 1. The latitude and longitude information is acquired by the current location acquiring unit 12, and is "35.658529, 139.745420", for example.
<S302>
Next, in S302, the helper selecting unit 1 acquires a support method corresponding to the requester attribute and the requested item, with reference to the support method storage unit 4.

An example of the information stored in the support method storage unit 4 is as illustrated in FIG. 8. Here, the helper selecting unit 1 acquires the support method "Please guide me to a barrier free toilet. Do not move the wheelchair suddenly. Let me know before moving." corresponding to the requester attribute "I use a wheelchair" and the requested item "I want support to travel to a nearby toilet".

Further, in S302, the helper selecting unit 1 acquires the helper candidate information with reference to the helper candidate information storage unit 5, which stores the information illustrated in FIG. 5.
<S303>
In S303, the helper selecting unit 1 determines whether a helper candidate satisfying condition 3 exists among the helper candidates referred from the helper candidate information storage unit 5. Condition 3 is that "the distance between the helper candidate and the requester is not more than 100 m, the helper candidate state is "A", indicating that there is plenty of spare time, or "B", indicating that there is a little spare time, and that the number of visits is "5+", indicating five or more times". It should be noted that "100 m" and "five times" are examples of threshold. The number of visits is the number of times the helper candidate has visited an area within a radius of 200 m of the current location of the helper candidate ("200 m" is an example of a threshold).

Here, since there is no corresponding helper candidate, the flow proceeds to S304. If there is a corresponding helper candidate, the flow proceeds to S308.
<S304>
In S304, the helper selecting unit 1 determines whether a helper candidate satisfying condition 4 exists among the helper candidates referred from the helper candidate information storage unit 5. Condition 4 is that "the distance between the helper candidate and the requester is not more than 100 m, and the helper candidate state is "A", indicating that there is plenty of spare time, or "B", indicating that there is a little spare time".

Here, since the helper candidate ID04 corresponds thereto, the flow proceeds to S308. If no corresponding helper candidate is found here either, the flow proceeds to S305.
<S308>
In S308, the helper selecting unit 1 stores the corresponding helper candidate ID, the latitude and longitude information of the requester, the requested item, the support method, the requester ID, and the requester notification text "A helper has been found" in the notification content storage unit 6.

More specifically, the helper selecting unit 1 stores the helper candidate ID "04" of the selected helper candidate, the latitude and longitude information "35.658529, 139.745420" of the requester, the requested item "I want support to travel to a nearby toilet", the support method "Please guide me to a barrier free toilet. Do not move the wheelchair suddenly. Let me know before moving.", the requester ID "102", and the requester notification text "A helper has been found" in the notification content storage unit 6.

<S305>

In S305, the helper selecting unit 1 determines whether a helper candidate satisfying condition 5 exists among the helper candidates referred from the helper candidate information storage unit 5. Condition 5 is that "the distance between the helper candidate and the requester is not more than 100 m".

If there are no helper candidates, the flow proceeds to S306. If there is a corresponding helper candidate, the flow proceeds to S308.

<S306>

In S306, the helper selecting unit 1 stores the requester ID "102", and the requester notification text "A helper has not been found" in the notification content storage unit 6.

<S307>

If the flow transitions from S306 to S307, the notifying unit 2 passes the requester notification text "A helper has not been found" to the output unit 14 of the requester terminal 101 of the requester ID "102" stored in the notification content storage unit 6, and the output unit 14 outputs the notification text.

If the flow transitions from S308 to S307, the notifying unit 2 passes the position information of the requester, the requested item, and the support method to the output unit 24 of the terminal 103 of the helper candidate ID stored in the notification content storage unit 6, and passes the notification text to the output unit 14 of the requester terminal 101, and the respective output units 24, 14 output the received information.

More specifically, the notifying unit 2 reads the helper candidate ID "04" of the selected helper candidate, the latitude and longitude information "35.658529, 139.745420" of the requester, the requested item "I want support to travel to a nearby toilet", the support method "Please guide me to a barrier free toilet. Do not move the wheelchair suddenly. Let me know before moving.", the requester ID "102", and the requester notification text "A helper has been found", which have been stored in the notification content storage unit 6.

Next, the notifying unit 2 passes the position information of the requester, based on the latitude and longitude information "35.658529, 139.745420" of the requester, the requested item "I want support to travel to a nearby toilet", and the support method "Please guide me to a barrier free toilet. Do not move the wheelchair suddenly. Let me know before moving." to the output unit 24 of the terminal 103 of the helper candidate ID04, and the output unit 24 outputs this information.

Further, the notifying unit 2 passes the notification text "A helper has been found" to the output unit 14 of the terminal 101 of the requester ID101, and the output unit 14 outputs the same.

Figure 14:
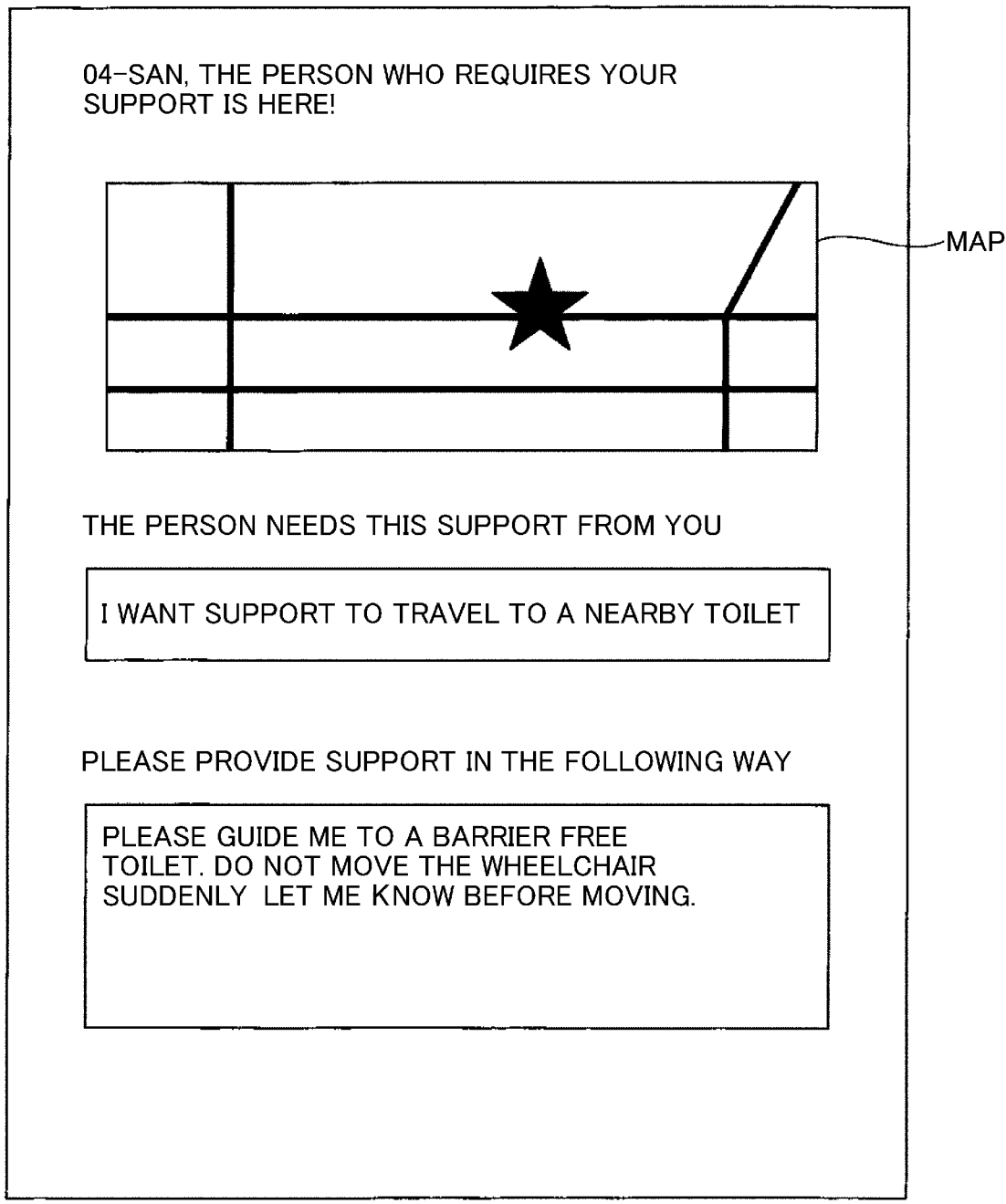
FIG. 14 is a drawing illustrating example 2 of the output screen of the helper candidate terminal.

FIG. 14 illustrates an example of the output screen of the helper candidate terminal 103, and FIG. 12 illustrates an example of the output screen of the requester terminal 101.

It should be noted that methods for displaying visually on a screen, methods for outputting using speech, and various other methods can be used as the output method for the output unit 24 of the helper candidate terminal 103, and the output method for the output unit 14 of the requester terminal 101.

<S309>

Furthermore, in S309, the notifying unit 2 passes the helper candidate ID stored in the notification content storage unit 6 to the helper approach detecting unit 15 of the requester terminal 101, and passes the requester ID to the requester approach detecting unit 25 of the helper candidate terminal 103.

The helper approach detecting unit 15 issues an output command to the output unit 14 when the helper candidate and the requester approach one another, and the output unit 14 outputs information indicating that the helper candidate has approached the requester. Similarly, the helper approach detecting unit 25 issues an output command to the output unit 24 when the helper candidate and the requester approach one another, and the output unit 24 outputs information indicating that the helper candidate has approached the requester.

The helper approach detecting unit 15 and the requester approach detecting unit 25 can be realized using short-range radio communication technology such as Bluetooth (registered trademark), for example.

Further, methods for outputting using speech, vibration, or light emission, and various other methods, can be used as the output method for the output unit 24 of the helper candidate terminal 103, and the output method for the output unit 14 of the requester terminal 101. It is thus possible for a helper to provide help reliably to a requester, such as a visually impaired person without a white cane, or a hearing-impaired person, who does not appear to have a disability.

(Variation)

Two embodiments have been described hereinabove, but the processing is not limited to the methods described thus far.

For example, in Embodiment 1, if set in advance by the requester, the flow may proceed to 205 without proceeding to S204 if no corresponding helper candidate is found in S203.

Carrying out processing in this way is effective for a requester who considers that, in S203, "a helper candidate who is a distance of not more than 200 m from the helper candidate, and who either has spare time or has the same destination as the requester" is a helper candidate capable of helping the requester without undue difficulty, and who would like to request help if there is such a helper candidate capable of providing help without undue difficulty, but who would not otherwise require help.

Further, as processing performed when the helper candidate and the requester register information in advance, information relating to their own gender may be registered. In Embodiment 2, utilizing the gender information, if set in advance by the requester, makes it possible to perform processing to search for a helper candidate having the same gender as the requester in S303, S304, and S305.

This processing is effective for a requester who would like the support for traveling to a nearby toilet, in Embodiment 2, to be provided by a helper candidate of the same gender. In particular, for a visually impaired person, even if support is provided to travel to the entrance of the toilet, it is not possible to see which cubicles are free, where the button is to flush the toilet, or where the place is to wash one's hands. If support is provided by a helper having the same gender as the requester, the helper is able to accompany the requester into the toilet to provide the necessary guidance. Holding information relating to the gender of both the helper candidates and the requester is a means for resolving such problems.

Further, there is not necessarily only one appropriate support method for one requested item. For example, if a requester who uses a wheelchair requests support to travel to a destination, this may include traveling over steps or stairs that the requester cannot overcome by him or herself. In such situations, in addition to a typical method for supporting travel by a wheelchair user, the specific method for overcoming steps or stairs must also be presented. Furthermore, the processing performed to select the helper candidate will need to be modified depending on the support method. If a support method that specifically presents the method for overcoming steps or stairs is selected, it is conceivable that a young male who has physical strength and is capable of reliably providing support to overcome steps or stairs is desirable as the helper. In order to enable such a selection method, the helper candidate information storage unit 5 holds information relating to the gender and age of the helper candidates, for example.

Further, in the processing performed when the helper candidate registers information in advance, information relating to types of attribute for which the helper candidate has provided support, and the number of times the helper candidate has supported a requester with each attribute, may also be registered.

If the helper selecting device 102 is provided with the function of storing the history of help performed by each helper candidate, it is possible for the helper candidate storage unit 5 to hold information relating to the help history, even without the helper candidates inputting the information manually. If set in advance by the requester, the processing may be configured to search for a helper candidate who has provided help for requesters having the same attribute as the requester at least a certain number of times. This processing is effective for requesters who feel anxious about receiving help, such as when requesting help for the first time.

SUMMARY OF EMBODIMENTS

This specification discloses, at least, the helper selecting devices, the helper selecting method, and the program in each of the following sections.
(Section 1)
A helper selecting device for selecting a helper for a requester who requires help, provided with: a first storage unit for storing helper candidate information received from a helper candidate terminal; a second storage unit for storing support methods; a helper selecting unit which selects a helper for the requester from among helper candidates, on the basis at least of the distance between the requester and the helper candidate, with reference to the first storage unit, and determines a support method for the requester with reference to the second storage unit; and a notifying unit for notifying the support method for the requester to the helper candidate terminal of the helper candidate selected as the helper.
(Section 2)
The helper selecting device as disclosed in section 1, wherein the helper selecting unit selects the helper on the basis of the distance between the requester and the helper candidate, and the amount of spare time of the helper candidate.
(Section 3)
The helper selecting device as disclosed in section 1, wherein the helper selecting unit selects the helper on the basis of the distance between the requester and the helper candidate, the amount of spare time of the helper candidate, and the number of times the helper candidate has visited the area around the current location of the helper candidate.
(Section 4)
The helper selecting device as disclosed in section 1, wherein the helper selecting unit selects the helper on the basis of the distance between the requester and the helper candidate, and whether the destination of the helper selecting unit is the same as the destination of the requester.
(Section 5)
The helper selecting device as disclosed in any one of section 1 to section 4, wherein the second storage unit stores the support method in association with a requester attribute and a requested item, and the helper selecting unit acquires the support method from the second storage unit on the basis of a requester attribute and a requested item received from a requester terminal.
(Section 6)
The helper selecting device as disclosed in any one of section 1 to section 5, wherein the notifying unit notifies an ID of the helper candidate selected as the helper to the requester terminal, and notifies an ID of the requester to the helper candidate terminal of the helper candidate selected as the helper, and if the requester and the helper approach one another, an output is performed by each of the requester terminal and the helper candidate terminal to indicate that the requester and the helper have approached one another.
(Section 7)
A helper selecting method executed by a helper selecting device for selecting a helper for a requester who requires help, including: a step for storing helper candidate information received from a helper candidate terminal in a first storage unit; a step for selecting a helper for the requester from among helper candidates, on the basis at least of the distance between the requester and the helper candidates, with reference to the first storage unit, and determining a support method for the requester with reference to a second storage unit for storing support methods; and a step for notifying the support method for the requester to the helper candidate terminal of the helper candidate selected as the helper.
(Section 8)
A program for causing a computer to function as each part of the helper selecting device disclosed in anyone of section 1 to section 6.

The present embodiment has been described hereinabove, but various variations and modifications may be made within the scope of the gist of the present invention as disclosed in the claims, without limitation to said specific embodiment.

REFERENCE SIGNS LIST

101 Requester terminal
11 Screen input unit
12 Current location acquiring unit
13 Schedule storage unit
14 Output unit
15 Helper approach detecting unit
102 Helper selecting device
1 Helper selecting unit
2 Notifying unit
3 Helper candidate state determining unit
4 Support method storage unit
5 Helper candidate information storage unit
6 Notification content storage unit
103 Helper candidate terminal
21 Screen input unit
22 Current location acquiring unit
23 Schedule storage unit
24 Output unit
25 Requester approach detecting unit
1000 Drive device
1001 Recording medium 1002 Auxiliary storage device
1003 Memory device
1004 CPU
1005 Interface device
1006 Display device
1007 Input device

The invention claimed is:

1. A helper selecting device for selecting a helper for a requester who requires help, the helper selecting device comprising circuitry configured to execute a method comprising:
storing helper candidate information received from a helper candidate terminal in a first storage;
storing support methods in a second storage;
selecting a helper for the requester from among helper candidates, on the basis at least of a distance between the requester and the helper candidate, with reference to the first storage;
determining a support method for the requester with reference to the second storage;
notifying the support method for the requester to the helper candidate terminal of the helper candidate selected as the helper; and
when the requester and the helper approach one another, outputting, by each of a requester terminal and a helper candidate terminal, an indication indicating that the requester and the helper have approached one another.

2. The helper selecting device as claimed in claim 1, the circuitry further configured to execute a method comprising:
selecting the helper on the basis of a distance between the requester and the helper candidate, and the amount of spare time of the helper candidate.

3. The helper selecting device according to claim 2, wherein the second storage stores the support method in association with a requester attribute and a requested item, and
the circuitry further configured to execute a method comprising:
acquiring the support method from the second storage on the basis of a requester attribute and a requested item received from the requester terminal.

4. The helper selecting device as claimed in claim 1, the circuitry further configured to execute a method comprising:
selecting the helper on the basis of the distance between the requester and the helper candidate, the amount of spare time of the helper candidate, and the number of times the helper candidate has visited the area around the current location of the helper candidate.

5. The helper selecting device as claimed in claim 1, the circuitry further configured to execute a method comprising:
selecting the helper on the basis of a combination of the distance between the requester and the helper candidate and whether a destination of the helper selecting device is identical to a destination of the requester.

6. The helper selecting device as claimed in claim 1, wherein the second storage stores the support method in association with a requester attribute and a requested item, and
the circuitry further configured to execute a method comprising:
acquiring the support method from the second storage on the basis of a requester attribute and a requested item received from the requester terminal.

7. The helper selecting device as claimed in claim 1, the circuitry further configured to execute a method comprising:
notifying an ID of the helper candidate selected as the helper to the requester terminal;
notifying an ID of the requester to the helper candidate terminal of the helper candidate selected as the helper.

8. A computer-implemented method for selecting a helper for a requester who requires help, the method comprising:
storing helper candidate information received from a helper candidate terminal in a first storage;
selecting a helper for the requester from among helper candidates, on the basis at least of the distance between the requester and the helper candidates, with reference to the first storage;
determining a support method for the requester with reference to a second storage for storing support methods;
notifying the support method for the requester to the helper candidate terminal of the helper candidate selected as the helper; and
when the requester and the helper approach one another, outputting, by each of a requester terminal and a helper candidate terminal, an indication indicating that the requester and the helper have approached one another.

9. The computer-implemented method according to claim 8, the method further comprising:
selecting the helper on the basis of a distance between the requester and the helper candidate, and the amount of spare time of the helper candidate.

10. The computer-implemented method according to claim 9, wherein the second storage stores the support method in association with a requester attribute and a requested item, and the method further comprising:
acquiring the support method from the second storage on the basis of a requester attribute and a requested item received from the requester terminal.

11. The computer-implemented method according to claim 8, the method further comprising:
selecting the helper on the basis of the distance between the requester and the helper candidate, the amount of spare time of the helper candidate, and the number of times the helper candidate has visited the area around the current location of the helper candidate.

12. The computer-implemented method according to claim 8, the method comprising:
selecting the helper on the basis of a combination of the distance between the requester and the helper candidate and whether a destination of the helper selecting device is identical to a destination of the requester.

13. The computer-implemented method according to claim 8, wherein the second storage stores the support method in association with a requester attribute and a requested item, and
the method further comprising:
acquiring the support method from the second storage on the basis of a requester attribute and a requested item received from the requester terminal.

14. The computer-implemented method according to claim 8, the method further comprising:
notifying an ID of the helper candidate selected as the helper to the requester terminal;
notifying an ID of the requester to the helper candidate terminal of the helper candidate selected as the helper.

15. A computer-readable non-transitory recording medium storing computer-executable program instructions that when executed by a processor cause a computer system to execute a method comprising:
storing helper candidate information received from a helper candidate terminal in a first storage;
storing support methods in a second storage;

selecting a helper for the requester from among helper candidates, on the basis at least of the distance between the requester and the helper candidate, with reference to the first storage;

determining a support method for the requester with reference to the second storage;

notifying the support method for the requester to the helper candidate terminal of the helper candidate selected as the helper; and when the requester and the helper approach one another, outputting, by each of a requester terminal and a helper candidate terminal, an indication indicating that the requester and the helper have approached one another.

16. The computer-readable non-transitory recording medium according to claim 15, the computer-executable program instructions when executed by a processor further cause a computer system to execute a method comprising:

selecting the helper on the basis of a distance between the requester and the helper candidate, and the amount of spare time of the helper candidate.

17. The computer-readable non-transitory recording medium according to claim 15, the computer-executable program instructions when executed by a processor further cause a computer system to execute a method comprising:

selecting the helper on the basis of the distance between the requester and the helper candidate, the amount of spare time of the helper candidate, and the number of times the helper candidate has visited the area around the current location of the helper candidate.

18. The computer-readable non-transitory recording medium according to claim 15, the computer-executable program instructions when executed by a processor further cause a computer system to execute a method comprising:

selecting the helper on the basis of a combination of the distance between the requester and the helper candidate and whether a destination of the helper selecting device is identical to a destination of the requester.

19. The computer-readable non-transitory recording medium according to claim 15, wherein the second storage stores the support method in association with a requester attribute and a requested item, and the computer-executable program instructions when executed by a processor further cause a computer system to execute a method comprising:

acquiring the support method from the second storage on the basis of a requester attribute and a requested item received from the requester terminal.

20. The computer-readable non-transitory recording medium according to claim 15, the computer-executable program instructions when executed by a processor further cause a computer system to execute a method comprising:

notifying an ID of the helper candidate selected as the helper to the requester terminal;

notifying an ID of the requester to the helper candidate terminal of the helper candidate selected as the helper.

* * * * *